US008068655B2

(12) United States Patent
Odry et al.

(10) Patent No.: US 8,068,655 B2
(45) Date of Patent: Nov. 29, 2011

(54) METHOD AND SYSTEM FOR VESSEL ENHANCEMENT AND ARTIFACT REDUCTION IN TOF MR ANGIOGRAPHY OF BRAIN

(75) Inventors: Benjamin L. Odry, West New York, NJ (US); Jens Guehring, Monmouth Junction, NJ (US)

(73) Assignee: Siemens Aktiengesellschaft, Munich (DE)

(*) Notice: Subject to any disclaimer, the term of this patent is extended or adjusted under 35 U.S.C. 154(b) by 741 days.

(21) Appl. No.: 12/284,126

(22) Filed: Sep. 18, 2008

(65) Prior Publication Data
US 2009/0087066 A1    Apr. 2, 2009

Related U.S. Application Data

(60) Provisional application No. 60/976,814, filed on Oct. 2, 2007.

(51) Int. Cl.
*G06K 9/00*    (2006.01)

(52) U.S. Cl. ..................... 382/131; 600/410
(58) Field of Classification Search .......... 382/128–132; 600/407, 410, 411
See application file for complete search history.

(56) References Cited

U.S. PATENT DOCUMENTS

| 5,167,232 A | 12/1992 | Parker et al. | 600/419 |
| 5,368,033 A | 11/1994 | Moshfeghi | 600/419 |
| 7,064,545 B2 | 6/2006 | Zaharchuk et al. | 324/307 |
| 7,206,628 B2 | 4/2007 | Kuehn | 600/410 |
| 7,330,028 B2 | 2/2008 | Zhao et al. | 324/309 |

*Primary Examiner* — Courtney Thomas (57) ABSTRACT

A method and system for vessel enhancement and artifact reduction in a 3D time-of-flight (TOF) magnetic resonance (MR) angiography brain image. An intensity-based threshold is used to extract structures of interest in the brain image. Vessels are isolated in the structures of interest by filtering the structures based on a vesselness measure. The vessels are then enhanced by multiplying the filtered image by a coefficient map based on intensities of the original brain image. The scalp is detected in the enhanced image, and the scalp is removed from the enhanced image to generate a noise-reduce enhanced image.

25 Claims, 10 Drawing Sheets

METHOD AND SYSTEM FOR VESSEL ENHANCEMENT AND ARTIFACT REDUCTION IN TOF MR ANGIOGRAPHY OF BRAIN

This application claims the benefit of U.S. Provisional Application No. 60/976,814, filed Oct. 2, 2007, the disclosure of which is herein incorporated by reference.

BACKGROUND OF THE INVENTION

The present invention relates to three-dimensional (3D) time-of-flight (TOF) magnetic resonance (MR) angiography, and more particularly, to vessel enhancement and artifact reduction in 3D TOF MR angiography of the brain.

Three dimensional (3D) time-of-flight (TOF) magnetic resonance (MR) angiography is a well-known technique for imaging vessels that has been adopted for routine assessment of stenosis and occlusions of intracranial blood vessels. 3D TOF MR angiography images blood vessels based on the phenomenon of flow-related enhancement of spins entering into an imaging slice. As a result of being unsaturated, these spins give more signal than surrounding stationary spins, thus enhancing blood vessels based on the blood flow in the vessels. With 3D TOF, a volume of images is obtained by simultaneously phase-encoding in the slice-select direction. An angiography appearance for visualizing vessels can be generated using maximum-intensity projection (MIP), as is typically done with 2D TOF. Multiple 3D TOF volumes can be combined in order to visualize longer segments of vessels.

Although 3D TOF MR angiography can allow a greater resolution in the slice-select direction than 2D TOF, loss of signal may be seen with the 3D TOF method in thick volumes with slow flowing blood. Accordingly, a method for providing increased vessel enhancement in 3D TOF MR images is desirable.

BRIEF SUMMARY OF THE INVENTION

The present invention provides improved visualization of vessel structures in 3D time-of-flight (TOF) magnetic resonance (MR) angiography images of the brain. Additionally, since surrounding structures, such as the scalp, in the brain images can produce a moderate to strong response to the 3D TOF imaging and therefore create unwanted noise effects, embodiments of the present invention selectively suppress artifacts as well as enhance vascular structures.

In one embodiment of the present invention, a histogram analysis of the brain image is performed to identify the different structures of interest in the brain image and specifically target the regions comprising vessels, by automatically computing an intensity-based threshold. Vessels are then isolated within the structures of interest by filtering the structures with a vesselness measure, such as the Frangi vesselness measure. The vessels are then enhanced by multiplying the filtered image by a coefficient map based on intensities of the original brain image. Additionally, the scalp is detected in the enhanced image, and removed from the enhanced image to generate a noise-reduced enhanced image.

These and other advantages of the invention will be apparent to those of ordinary skill in the art by reference to the following detailed description and the accompanying drawings.

DETAILED DESCRIPTION OF EXEMPLARY EMBODIMENTS

The present invention relates to a method for vessel enhancement and artifact reduction in 3D time-of-flight (TOF) magnetic resonance (MR) angiography images of the brain. Embodiments of the present invention are described herein to give a visual understanding of the vessel enhancement and artifact suppression method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention utilize a two-stage method to selectively suppress artifacts and enhance vascular structures in a 3D TOF MR angiography brain image. The first stage involves enhancement of the vascular structures, and the second stage involves a detection of the scalp in the brain image in order to selectively suppress noise generated by the scalp. In order to enhance the vessels in the brain image, a general automatically computed threshold is applied to select structures in the brain image, a vesselness analysis performed on the selected structures to isolate vascular structures, and the enhancing the vascular structures using a coefficient on the resulting volume based on the intensity of the voxels. The scalp detection is realized using mathematical morphology methods to isolate the background and consequently obtain a segmentation of the head. B-spline interpolation can optionally be applied to smooth the contour of the head.

Figure 1:
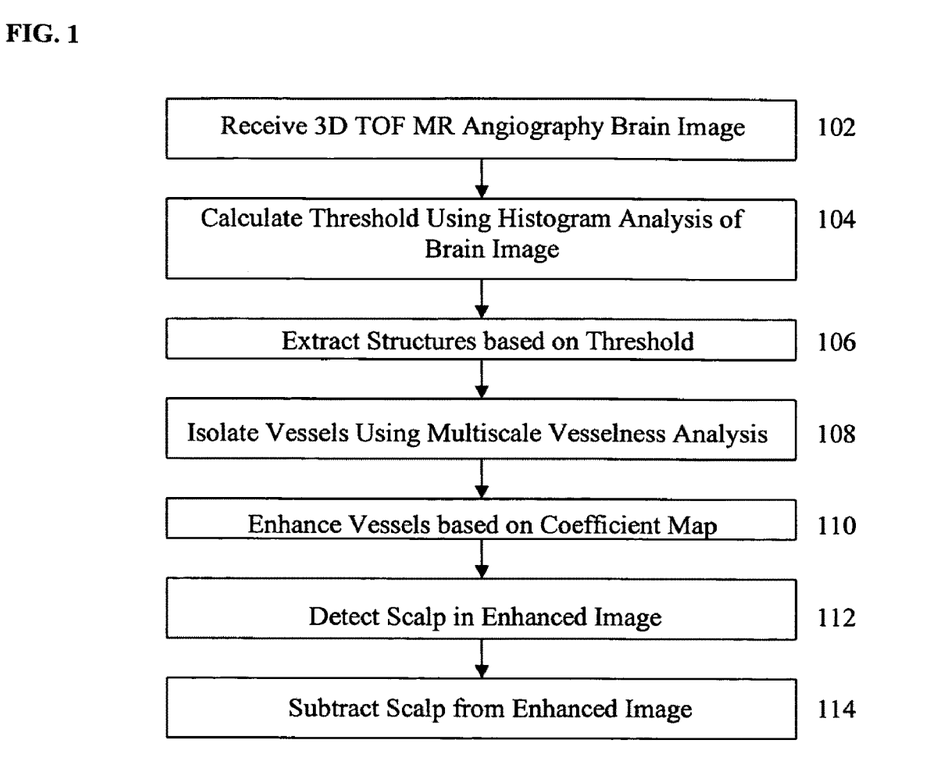
FIG. 1 illustrates a method for vessel enhancement and artifact reduction in a 3D TOF MR angiography brain image according to an embodiment of the present invention.

FIG. 1 illustrates a method for vessel enhancement and artifact reduction in a 3D TOF MR angiography brain image according to an embodiment of the present invention. As illustrated in FIG. 1, at step 102, a 3D TOC MR angiography brain image is received. The brain image can be acquired directly from an MR scanning device, or the brain image can be loaded from a memory or storage of a computer system, or a computer readable medium.

Figure 2:
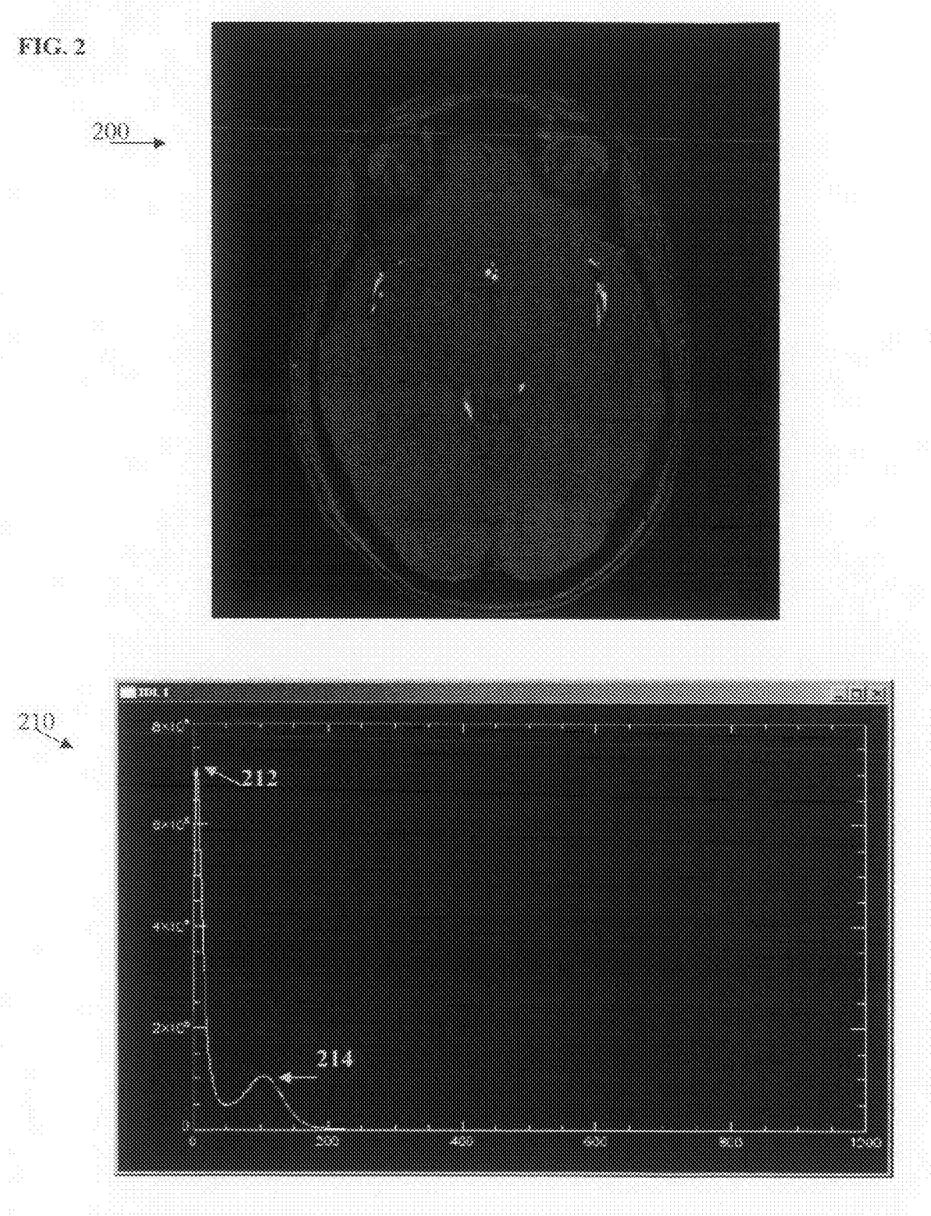
FIG. 2 illustrates histogram analysis of an MR brain volume.

At step 104, a threshold is calculated using histogram analysis of the TOC MR brain image. The threshold is an intensity-based threshold calculated to target vascular structures in the brain image. The threshold, when applied to the image data, captures the majority of vessels in the image. FIG. 2 illustrates histogram analysis of an MR brain volume.

As illustrated in FIG. 2, image 200 is an axial slice of an MR brain volume, and image 210 is a histogram of intensities of the MR brain volume. The bimodal shape of the histogram h eases the process of obtaining the threshold value. As shown in FIG. 2, the histogram 210 distinctly shows two peaks 212 and 214, one peak 212 for the background at about 10 gray-levels and another peak 214 for the tissue at about 110 gray-levels. Weakly enhanced vessels in the MR volume have an intensity that falls approximately at the tissue peak 214. Therefore, in order to catch most of the vessels, the threshold can be set at the value of the tissue peak 214.

The best value for the tissue peak can be determined based on the 1$^{st}$ order derivative h' of the histogram h. The sign of 1$^{st}$ order derivative shows increases and decreases in the histogram, and consequently the best value for the peak. The histogram can be smoothed to allow easier detection of the change of sign of the derivative. With the bimodal shape of h, the threshold is calculated by determining when the derivative switches to negative for the second time. This can be done by analyzing the positive sections of h' and verifying that two consecutive sections are distinct and spaced out enough along the histogram to be considered. Let h be the histogram of the 3D volume and h' the 1$^{st}$ derivative of h. The positive section $Sec_{h'pos}$ is defined as $Sec_{h'pos} = \cup x/h'_{pos}(x) > 0$, with x representing the gray-levels. Individual sections are determined when $x^{pos}i - x^{pos}i+1 >$ tolerance, where $x^{pos}i$ and $x^{pos}i+1$ are consecutive points in the list of positive h'(x). This means that a minimum spacing, defined here as tolerance, needs to be present to consider two individual positive sections. The threshold is set to the last gray-level of the second positive section, corresponding to the start of the decrease in h.

Figure 3:
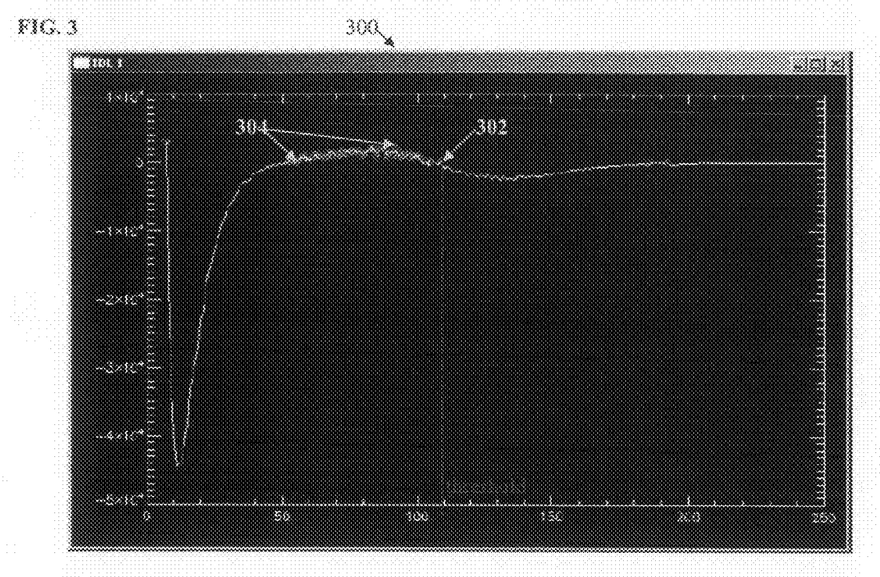
FIG. 3 illustrates a $1^{st}$ order derivative of a histogram.

FIG. 3 illustrates a 1$^{st}$ order derivative of a histogram. Image 300 is the 1$^{st}$ order derivative of histogram 210 of FIG. 2 limited to 250 gray-levels. As shown in FIG. 3, the threshold 302 is selected as the last point of the second positive section 304.

Returning to FIG. 1, at step 106, structures are extracted from the MR volume based on the calculated threshold. Once the threshold is calculated, it is applied to the MR brain volume to extract the structures of interest. These structures include vascular (vessel) structures as well as some surrounding tissue. In particular, structures of interest are extracted by extracting voxels having an intensity greater than or equal to the threshold.

At step 108, vessels are isolated in the structures of interest using a multiscale vesselness analysis. The extracted structures of interest are filtered based on a measure of vesselness. According to an advantageous implementation described herein, the Frangi vesselness measure can be used for the vesselness analysis. Although the use of the Frangi vesselness measure is described herein, the present invention is not limited thereto, and other techniques for measuring vesselness, such as the well-known Shikata method and the well-known Li method, can be used as well.

The Frangi approach is based on the calculation of the Hessian matrix at selected locations, i.e., each voxel of the extracted structures of interest. The Hessian matrix corresponds to the second order derivative at the location. Eigenvalues and eigenvectors of the matrix are calculated and used to calculate a vesselness measure at each voxel as follows. For increasing-magnitude eigenvalues of a Hessian matrix $|\lambda_1| \leq |\lambda_2| \leq |\lambda_3|$, the Frangi vesselness function is composed of three components formulate to discriminate tubular (vascular) structures from blob-like and/or plate-like structures as shown below:

$$Vf(\lambda) = \begin{cases} 0 \text{ if } \lambda_2 > 0 \text{ or } \lambda_3 > 0 \\ \left(1 - e^{-\frac{R_A^2}{2\alpha^2}}\right) \cdot \left(1 - e^{-\frac{R_B^2}{2\beta^2}}\right) \cdot \left(1 - e^{\frac{S^2}{2\gamma^2}}\right) \text{ otherwise} \end{cases}$$

with $$R_A = \frac{|\lambda_2|}{|\lambda_3|}, R_B = \frac{|\lambda_1|}{\sqrt{|\lambda_2 \lambda_3|}}, \text{ and } S = \sqrt{\lambda_1^2 + \lambda_2^2 + \lambda_3^2},$$

and $\alpha$, $\beta$, $\gamma$ are thresholds that control the sensitivity of the vesselness measure.

The vesselness measure can be calculated at each voxel at two different scales. Hessian matrices of two different sizes are calculated at each voxel corresponding to the two different scales. Eigenvalues and eigenvalues are calculated for the Hessian matrices, and a vesselness measure is calculated for each scale based on the eigenvalues and eigenvectors for each size hessian matrix. The extracted structures of interest are filtered by calculating the vesselness measure for each voxel at each scale.

Figure 4:
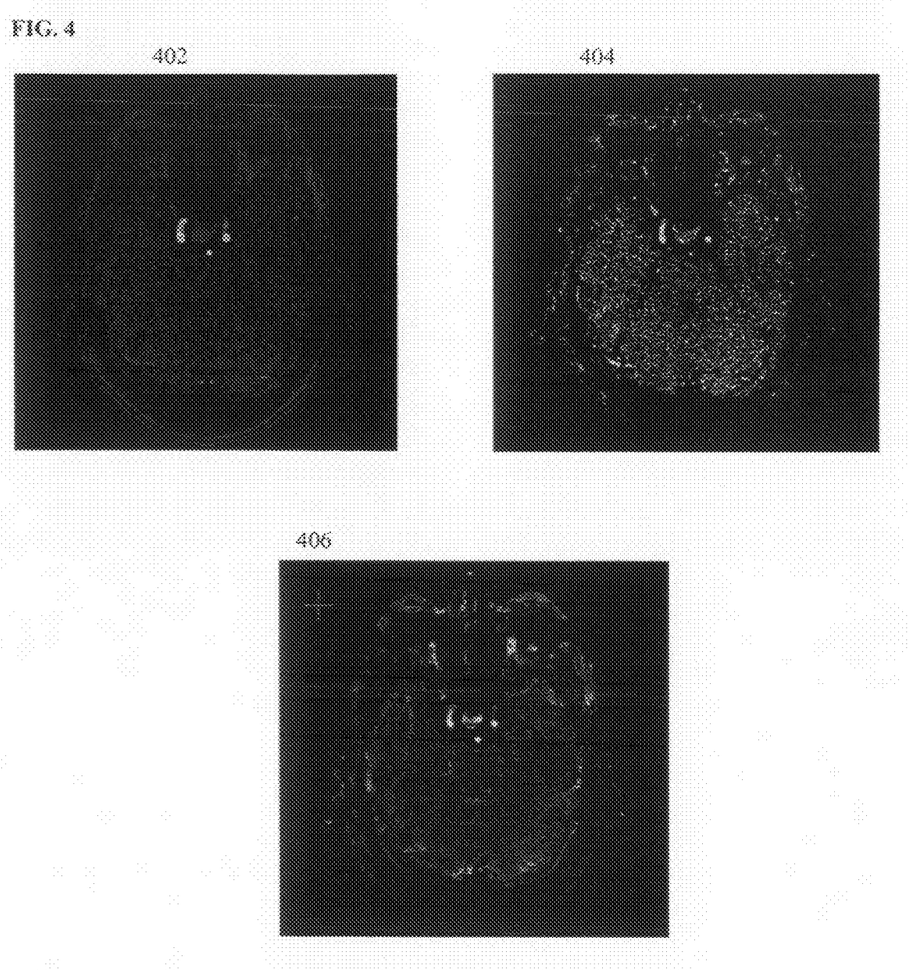
FIG. 4 illustrates exemplary vesselness filtering results.

FIG. 4 illustrates exemplary vesselness filtering results. As illustrated in FIG. 4, image 402 show structures of interest extracted based on the histogram analysis. Image 404 shows a Frangi-filtered image generated from image 402 using the Frangi vesselness measure with a small scale. Image 406 shows a Frangi-filtered image generated from image 402 using the Frangi vesselness measure with a large scale. The Frangi-filtered images 404 and 406 show that although tissues are also enhanced, vessels in the images take on a higher intensity value after filtering. Depending on the scale used for the filtering, smaller or larger vessels are targeted.

Returning to FIG. 1, at step 110, the vessels are enhanced based on a coefficient map. The vessels are enhanced by combining the filtered "vesselness" images generated in step 108 with a coefficient map generated based on the maximum intensity of the original volume. The coefficient map is generated by dividing the intensity for each voxel of the original volume by the maximum intensity of the original volume, as shown below:

$$coef(i,j) = \frac{I(i,j)}{\max(I)}$$

Figure 5:
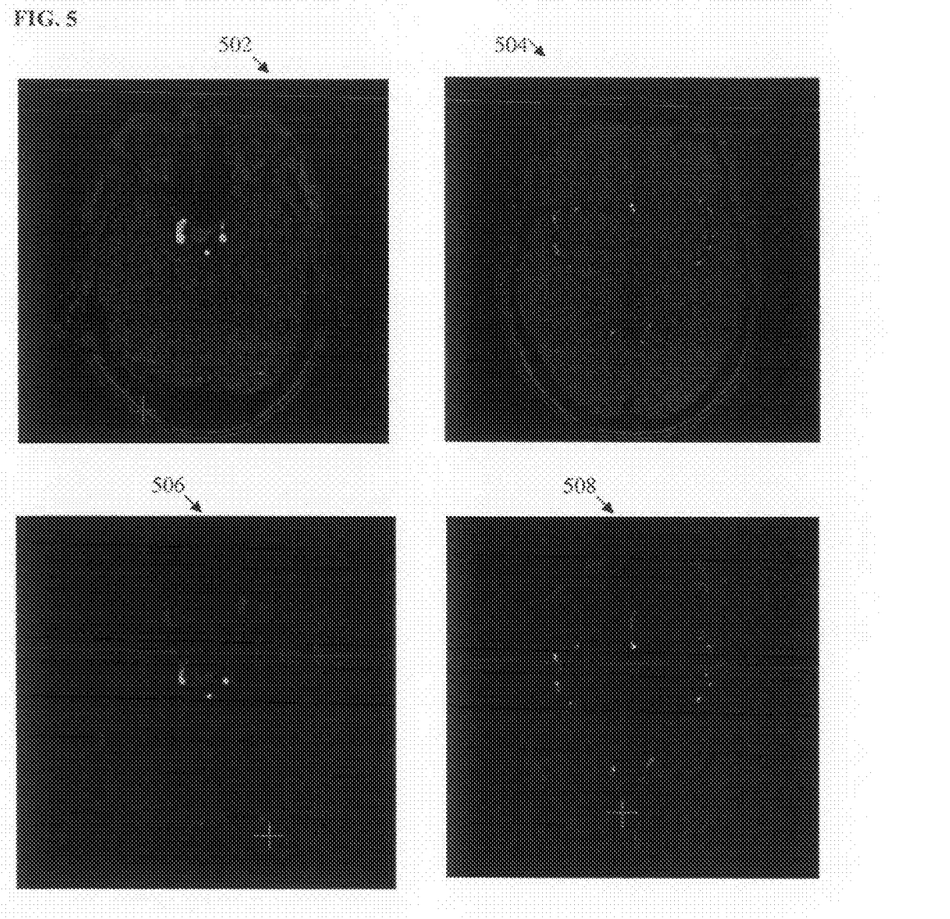
FIG. 5 illustrates exemplary structure enhancement results.

It is also possible to use a low limit with the coefficient to reduce the tissue's intensity whenever the corresponding coefficient in below a predetermined value. By multiplying the Frangi-filtered images by the coefficient map, the intensity of vascular structures is mostly kept the same whereas, the one of surrounding structures is decreased resulting in an enhanced image of the vessels per scale. The final image of enhanced vascular structures is the union of both of the large and small scale filtered images, including large and small vessels. FIG. 5 illustrates exemplary structure enhancement results. As illustrated in FIG. 5, images 502 and 504 are original axial slices of an MR brain volume. Images 506 and 508 are enhanced images corresponding to the original images 502 and 504, respectively, generated by multiplying Frangi-filtered images by coefficient maps. As shown, vessel structures are enhanced in the enhanced images 506 and 508.

Figure 6:
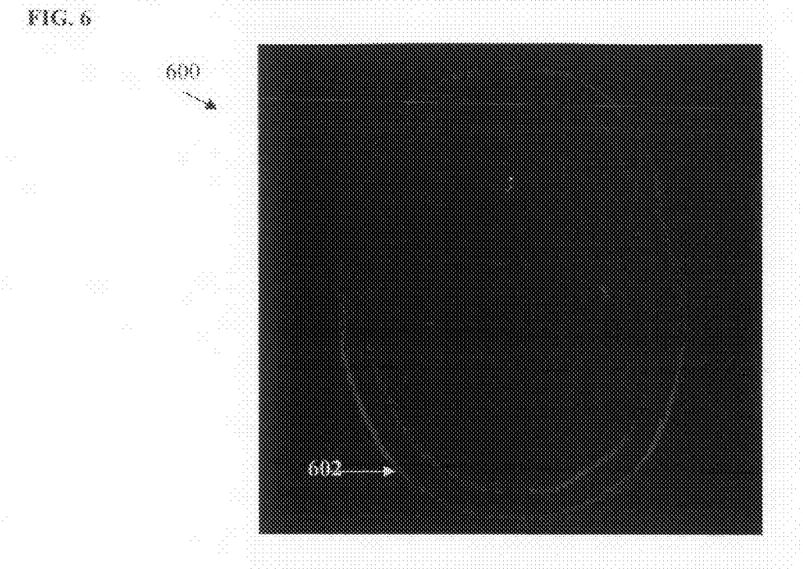
FIG. 6 illustrates an example of scalp enhancement.

Returning to FIG. 1, at step 112, the scalp is detected in the enhanced image. When image enhancement is performed using the Frangi-filtering and the coefficient map, the scalp can be enhanced as well, particularly at the borders of the volume. FIG. 6 illustrates an example of scalp enhancement. As illustrated in FIG. 6, image 600 is an enhanced image generated using Frangi-filtering and a coefficient map. As shown in image 600, the scalp 602 is enhanced in the enhanced image. In order to resolve this problem, the scalp is segmented and subtracted from the enhanced image.

Figure 7:
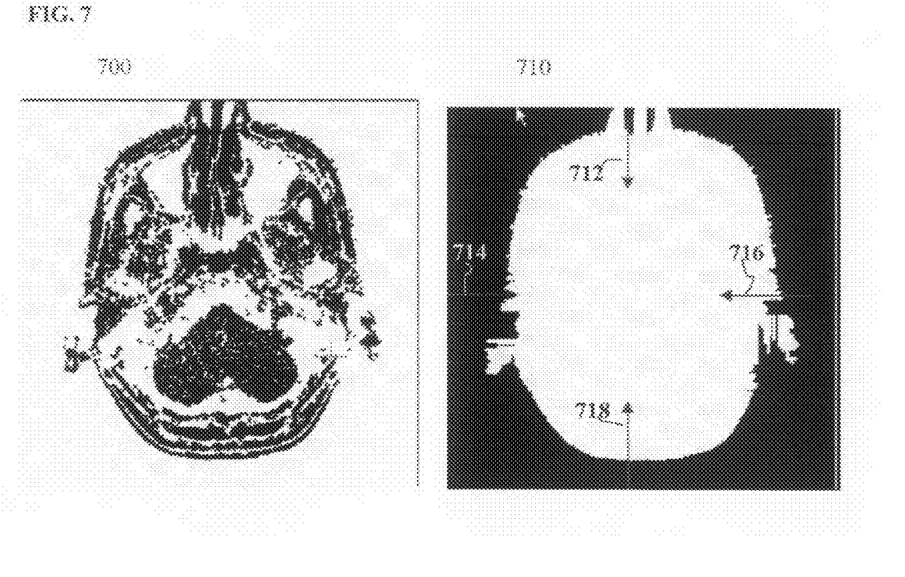
FIG. 7 illustrates exemplary scalp tracking results.

In order to detect the scalp in the enhanced image, a histogram is used to determine a threshold for the background. Using this threshold, a mathematical morphology opening is used to make the background uniform. Then starting from right, left, top, and bottom boundaries of each slice of the 3D enhanced image (volume), the scalp boundary is tracked by checking pixels to determine whether each pixel is part of the scalp, one after another towards the center of the slice, thus obtaining curves that represent the scalp in four directions. FIG. 7 illustrates exemplary scalp tracking results. As illustrated in FIG. 7, image 700 shows an image slice having a uniform background after the thresholding and morphology opening processes, and image 710 shows the result of scalp tracking issued from the uniform background of image 700. As shown in image 710, the scalp is tracked in four tracking directions 712, 714, 716, and 718, reaching out to the first "zero" voxel that represents the head, to ultimately form a contour of head. The head contour is filled and is shown in image 710.

Figure 8:
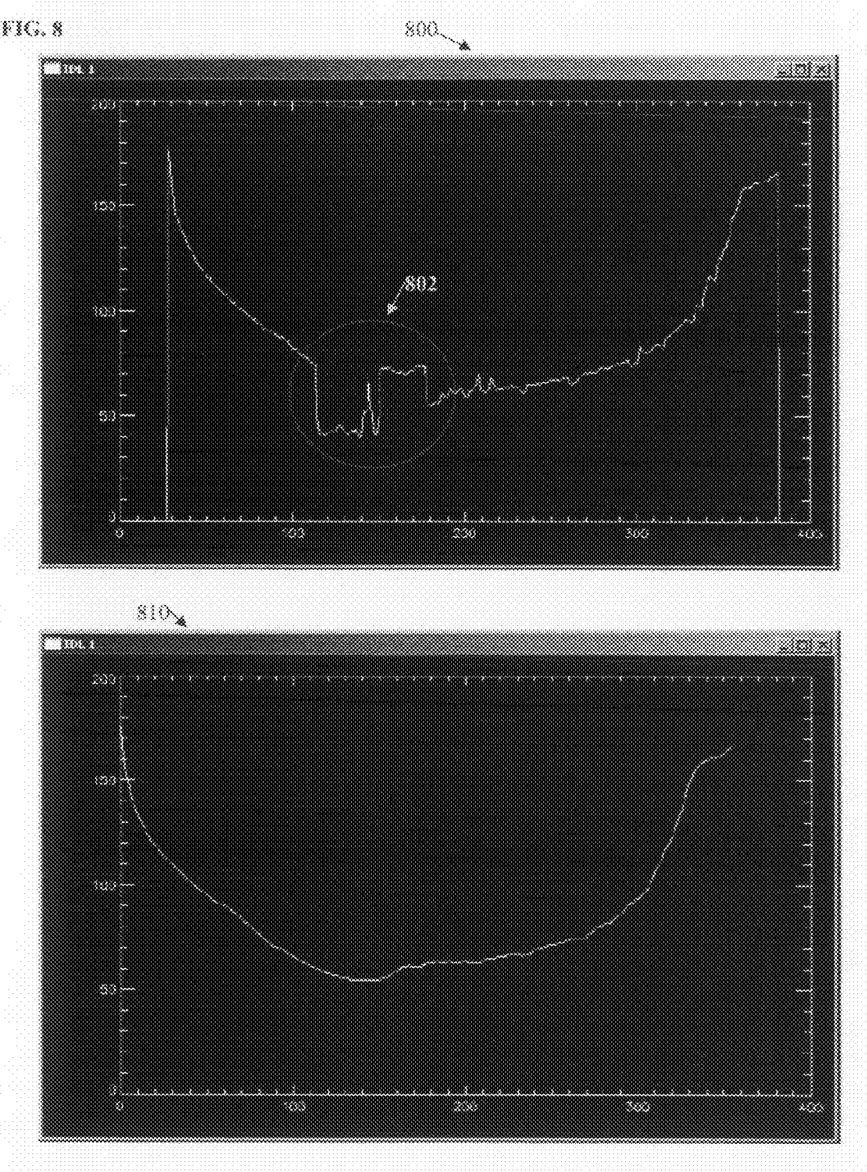
FIG. 8 illustrates exemplary curves representing a head contour before and after smoothing.

As shown in FIG. 7, the ears are set as part of the head, and part of the background intrudes into the head. This can cause problems if these regions are excluded, since vessels could be affected. Therefore, the head contour is smoothed to remove the effects of the ears and background intrusions into the head region. The left and right contours of the head are extracted as curves. FIG. 8 illustrates exemplary curves representing a head contour before and after smoothing. Image 800 is a curve representing a left head contour obtained by the scalp tracking. Using the derivative of this curve, positions of the ears and background intrusions into the head are located. As shown in image 800, region 802 of the curve represents the ears and background intrusions in the left head contour. In order to remove the ears and background intrusions, a B-spline is used to smooth them out, based on the initial curvature. Image 810 shows a curve representing the left head contour after B-spline smoothing. It can be seen that the ear and background intrusions region 802 is no longer present in curve 810. The right head contour is similarly processed to remove the ear and background intrusions from the right head contour. This defines new boundaries for the head region, and the head is then filled out (segmented) based on the new boundaries.

Figure 9:
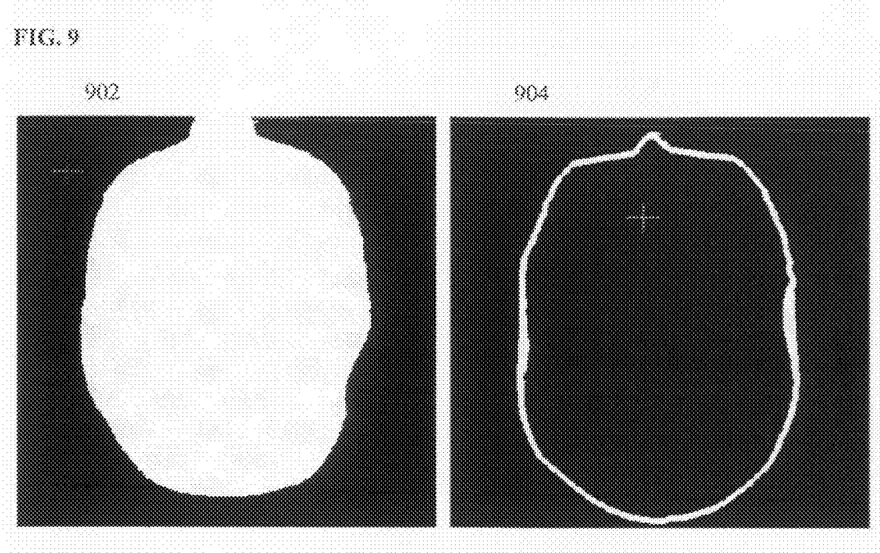
FIG. 9 illustrates exemplary scalp detection results.

The segmented head region is eroded using morphological operators, resulting in an eroded sub-region. The scalp is determined as the difference between the segmented head region and its eroded sub-region. The thickness of the scalp exclusion zone is determined by the number of erosions. For example, a fixed number of erosions (e.g., 5) can be used for simplicity, however, additional local erosions may be used to better adapt the anatomical shape of the specific parts of the head (e.g., back of the head). FIG. 9 illustrates exemplary scalp detection results. As illustrated in FIG. 9, image 902 shows the segmented head region, and image 904 shows the scalp detected from the segmented head region.

Returning to FIG. 1, at step 114, the detected scalp is subtracted from the enhanced image. The detected scalp and enhanced regions connected to the scalp can be excluded from the enhance image, thus eliminating noise generated by the scalp in visualization of the enhanced image. This results in a noise-reduced enhanced image.

The noise reduced enhanced image is output. The noise-reduced enhanced image can be output by displaying the noise-reduced enhanced image, for example on a display of a computer system. The noise-reduced enhanced image can also be output by storing the noise-reduced enhanced image, for example on a computer readable medium or memory or storage of a computer system.

Figure 10:
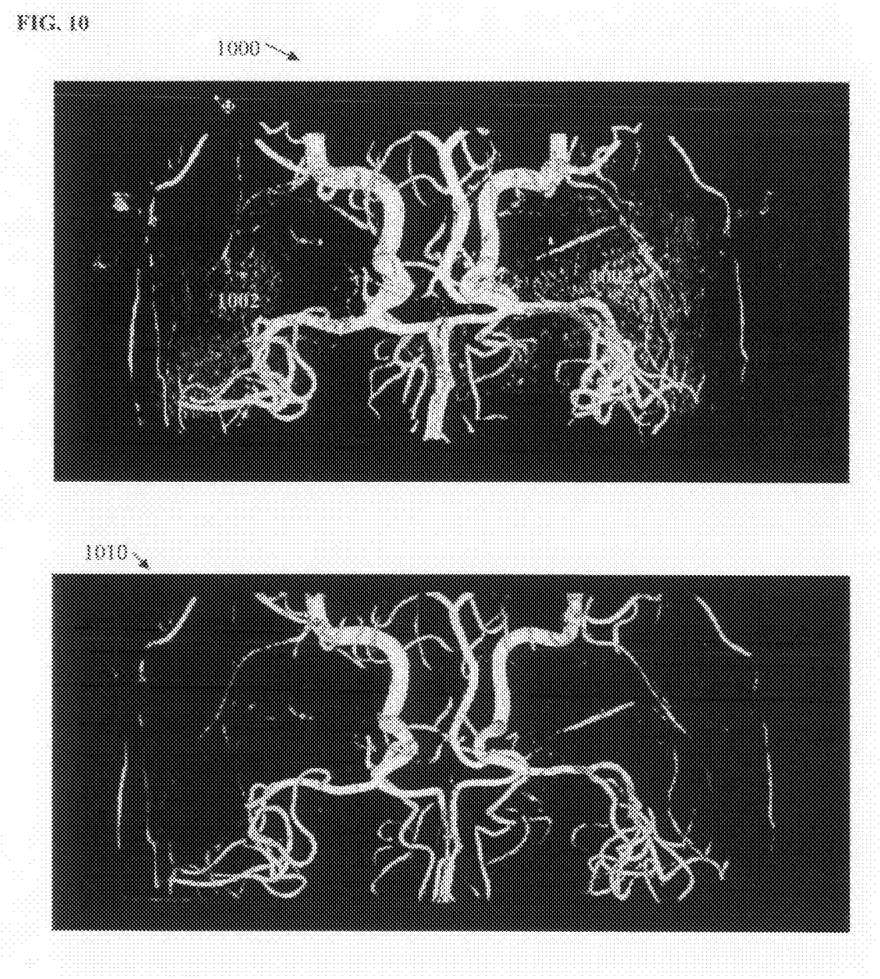
FIG. 10 illustrates exemplary results of the vessel enhancement and artifact reduction method of FIG. 1.

FIG. 10 illustrates exemplary results of the vessel enhancement and artifact reduction method of FIG. 1. As illustrated in FIG. 10, image 1000 is a 3D visualization of an original 3D TOF MR angiography brain image, and image 1010 is a 3D visualization of a noise-reduced enhanced image generated from the original image 1000 using the method of FIG. 1. As shown in the original image 1000, noise 1002 resulting from the scalp surface can be seen in the original image 1000. As shown in the noise-reduced enhanced image 1010, the noise-reduced enhanced image 1010 has a high level of detail for the vascular structures, without the noise caused by the scalp.

Figure 11:
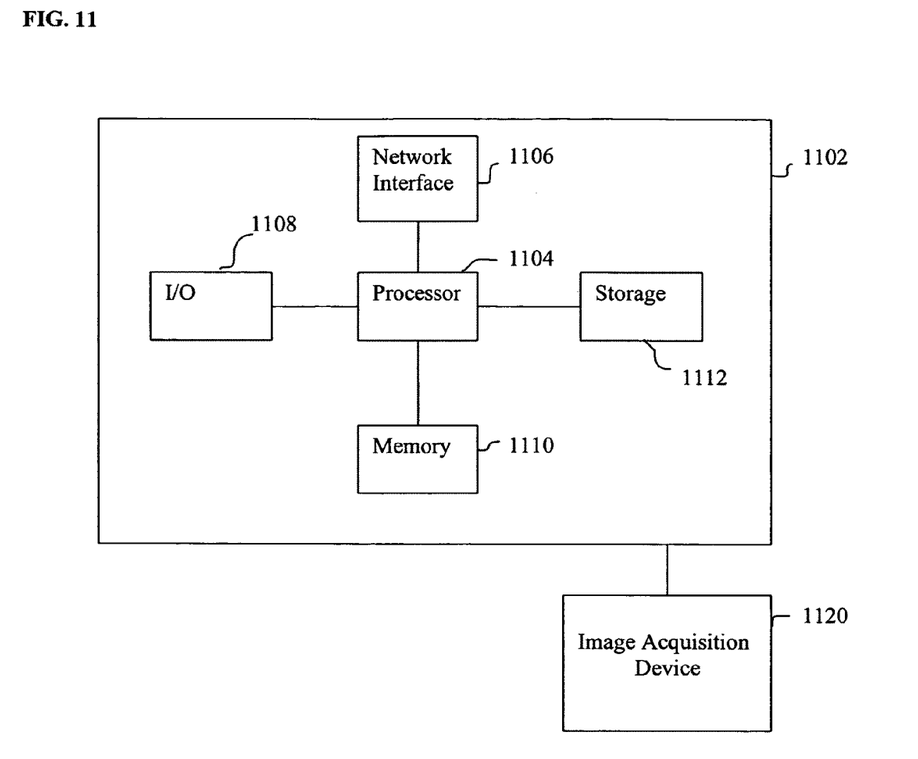
FIG. 11 illustrates a high-level block diagram of a computer capable of implementing the present invention.

The above-described method for vessel enhancement and artifact reduction in a 3D TOF MR angiography brain image may be implemented on a computer using well-known computer processors, memory units, storage devices, computer software, and other components. A high-level block diagram of such a computer is illustrated in FIG. 11. Computer 1102 contains a processor 1104 which controls the overall operation of the computer 1102 by executing computer program instructions which define such operation. The computer program instructions may be stored in a storage device 1112 (e.g., magnetic disk) and loaded into memory 1110 when execution of the computer program instructions is desired. Thus, the method steps of FIG. 1 can be defined by the computer program instructions stored in the memory 1110 and/or storage 1112 and controlled by the processor 1104 executing the computer program instructions. For example, the computer program instructions can be implemented as computer executable code programmed by one skilled in the art to perform an algorithm defined by the method steps of FIG. 1. Accordingly, by executing the computer program instructions, the processor 1104 executes an algorithm defined by the method steps of FIG. 1. An image acquisition device 1120, such as an MR scanning device, can be connected to the computer 1102 to input 3D TOF MR images to the computer 1102. It is possible to implement the image acquisition device 1120 and the computer 1102 as one device. It is also possible that the image acquisition device 1120 and the computer 1102 communicate wirelessly through a network. The computer 1102 also includes one or more network interfaces 1106 for communicating with other devices via a network. The computer 1102 also includes other input/output devices 1108 that enable user interaction with the computer 1102 (e.g., display, keyboard, mouse, speakers, buttons, etc.) One skilled in the art will recognize that an implementation of an actual computer could contain other components as well, and that FIG. 11 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

Those skilled in the art could implement various other feature combinations without departing from the scope and spirit of the invention.

The invention claimed is:

1. A method for vessel enhancement and artifact reduction in a 3D time-of-flight (TOF) magnetic resonance (MR) angiography brain image, comprising:
    extracting structures in the brain image based on an intensity threshold;
    isolating vessels in said structures by filtering said structures using a vesselness measure, resulting in a filtered image;
    multiplying the filtered image by a coefficient map based on intensities of the brain image to enhance a vascular structure by eliminating surrounding structures, resulting in an enhanced image of the vascular structure;
    detecting a scalp in the enhanced image; and
    generating a noise-reduced enhanced image by subtracting the scalp from the enhanced image.

2. The method of claim 1, wherein said step of extracting structures in the brain image based on an intensity threshold comprises:
    calculating the intensity threshold based on a histogram of the brain image; and
    extracting voxels in the brain image having intensities greater than the intensity threshold.

3. The method of claim 2, wherein said step of calculating the intensity threshold based on a histogram of the brain image comprises:
    calculating the intensity threshold as an intensity corresponding to a last point of a second positive section in a $1^{st}$ order derivative of the histogram.

4. The method of claim 1, wherein said vesselness measure is one of a Frangi, Shikata, and Li vesselness measure.

5. The method of claim 1, wherein said step of isolating vessels in said structures by filtering said structures using a vesselness measure comprises:
    filtering said structures using the vesselness measure at multiple scales.

6. The method of claim 5, wherein said step of filtering said structures using the vesselness measure at multiple scales comprises:
    calculating first and second Hessian matrices for each voxel of said structures art first and second scales;
    calculating eigenvalues and eigenvectors of the first and second Hessian matrices for each voxel of said structures; and
    calculating first and second Frangi vesselness measures at each voxel of said structures based on the eigenvalues and eigenvectors of the first and second Hessian matrices, resulting in first and second filtered images.

7. The method of claim 6, wherein said step of multiplying the filtered image by a coefficient map based on intensities of the brain image to enhance a vascular structure by eliminating surrounding structures comprises:
    generating the coefficient map by dividing an intensity of each voxel in the brain image by a maximum intensity of the brain image; and
    multiplying the coefficient map by the first and second filtered images to generate first and second enhanced images corresponding to the first and second scales, respectively; and
    generating the enhanced image of the vascular structure as a union of the first and second enhanced images.

8. The method of claim 1, wherein said step of detecting a scalp in the enhanced image comprises:
    obtaining curves representing a head contour;
    smoothing the curves to remove ears and background intrusions into a head region;
    segmenting the head region based on the smoothed curves;
    eroding the segmented head region using morphological operators to generate an eroded sub-region; and
    detecting the scalp as a difference between the segmented head region and the eroded sub-region.

9. The method of claim 8, wherein said step of obtaining a curve representing a head contour comprises:
    applying a threshold and mathematical morphology to make the background of the enhanced image uniform; and
    tracking a scalp boundary from left, right, top, and bottom boundaries of each of a plurality of slices of the enhanced image to generated curves representing the scalp in four directions.

10. An apparatus for vessel enhancement and artifact reduction in a 3D time-of-flight (TOF) magnetic resonance (MR) angiography brain image, comprising:
    means for extracting structures in the brain image based on an intensity threshold;
    means for isolating vessels in said structures by filtering said structures using a vesselness measure to generate a filtered image;
    means for enhancing the vessels by multiplying the filtered image by a coefficient map based on intensities of the brain image to generate an enhanced image;
    means for detecting a scalp in the enhanced image; and
    means for generating a noise-reduced enhanced image by subtracting the scalp from the enhanced image.

11. The apparatus of claim 10, wherein said means for extracting structures in the brain image based on an intensity threshold comprises:
    means for calculating the intensity threshold based on a histogram of the brain image; and
    means for extracting voxels in the brain image having intensities greater than the intensity threshold.

12. The apparatus of claim 10, wherein said vesselness measure is one of a Frangi, Shikata, and Li vesselness measure.

13. The apparatus of claim 10, wherein said means for isolating vessels in said structures by filtering said structures using a vesselness measure comprises:
    means for filtering said structures using the vesselness measure at multiple scales.

14. The apparatus of claim 13, wherein said means for filtering said structures using the vesselness measure at multiple scales comprises:
    means for calculating first and second Hessian matrices for each voxel of said structures art first and second scales;
    means for calculating eigenvalues and eigenvectors of the first and second Hessian matrices for each voxel of said structures; and
    means for calculating first and second Frangi vesselness measures at each voxel of said structures based on the eigenvalues and eigenvectors of the first and second Hessian matrices, resulting in first and second filtered images.

15. The apparatus of claim 10, wherein said means for enhancing the vessels by multiplying the filtered image by a coefficient map based on intensities of the brain image to generate an enhanced image comprises:

means for generating the coefficient map by dividing an intensity of each voxel in the brain image by a maximum intensity of the brain image; and means for multiplying the coefficient map by the first and second filtered images to generate first and second enhanced images corresponding to the first and second scales, respectively; and means for generating the enhanced image as a union of the first and second enhanced images.

16. The apparatus of claim 10, wherein said means for detecting a scalp in the enhanced image comprises:

means for obtaining curves representing a head contour;

means for smoothing the curves to remove ears and background intrusions into a head region;

means for segmenting the head region based on the smoothed curves;

means for eroding the segmented head region using morphological operators to generate an eroded sub-region; and means for defining the scalp as a difference between the segmented head region and the eroded sub-region.

17. The apparatus of claim 16, wherein said means for obtaining a curve representing a head contour comprises:

means for applying a threshold and mathematical morphology to make the background of the enhanced image uniform; and means for tracking a scalp boundary from left, right, top, and bottom boundaries of each of a plurality of slices of the enhanced image to generated curves representing the scalp along four directions.

18. A computer readable medium encoded with computer executable instructions for vessel enhancement and artifact reduction in a 3D time-of-flight (TOF) magnetic resonance (MR) angiography brain image, the computer executable instructions defining steps comprising:

extracting structures in the brain image based on an intensity threshold;

isolating vessels in said structures by filtering said structures using a vesselness measure, resulting in a filtered image;

enhancing the vessels by multiplying the filtered image by a coefficient map based on intensities of the brain image, resulting in an enhanced image;

detecting a scalp in the enhanced image; and generating a noise-reduced enhanced image by subtracting the scalp from the enhanced image.

19. The computer readable medium of claim 18, wherein the computer executable instructions defining the step of extracting structures in the brain image based on an intensity threshold comprise computer executable instructions defining the steps of:

calculating the intensity threshold based on a histogram of the brain image; and extracting voxels in the brain image having intensities greater than the intensity threshold.

20. The computer readable medium of claim 18, wherein said vesselness measure is one of a Frangi, Shikata, and Li vesselness measure.

21. The computer readable medium of claim 18, wherein the computer executable instructions defining the step of isolating vessels in said structures by filtering said structures using a vesselness measure comprise computer executable instructions defining the step of:

filtering said structures using the vesselness measure at multiple scales.

22. The computer readable medium of claim 21, wherein the computer executable instructions defining the step of filtering said structures using the vesselness measure at multiple scales comprise computer executable instructions defining the steps of:

calculating first and second Hessian matrices for each voxel of said structures art first and second scales;

calculating eigenvalues and eigenvectors of the first and second Hessian matrices for each voxel of said structures; and calculating first and second Frangi vesselness measures at each voxel of said structures based on the eigenvalues and eigenvectors of the first and second Hessian matrices, resulting in first and second filtered images.

23. The computer readable medium of claim 18, wherein the computer executable instructions defining the step of enhancing the vessels by multiplying the filtered image by a coefficient map based on intensities of the brain image comprise computer executable instructions defining the steps of:

generating the coefficient map by dividing an intensity of each voxel in the brain image by a maximum intensity of the brain image; and multiplying the coefficient map by the first and second filtered images to generate first and second enhanced images corresponding to the first and second scales, respectively; and generating the enhanced image of the vascular structure as a union of the first and second enhanced images.

24. The computer readable medium of claim 18, wherein the computer executable instructions defining the step of detecting a scalp in the enhanced image comprise computer executable instructions defining the steps of:

obtaining a curve representing a head contour;

smoothing the curve to remove ears and background intrusions into a head region;

segmenting the head region based on the smoothed curve;

eroding the segmented head region using morphological operators to generate an eroded sub-region; and detecting the scalp as a difference between the segmented head region and the eroded sub-region.

25. The computer readable medium of claim 24, wherein the computer executable instructions defining the step of obtaining a curve representing a head contour comprise computer executable instructions defining the steps of:

applying a threshold and mathematical morphology to make the background of the enhanced image uniform; and tracking a scalp boundary from left, right, top, and bottom boundaries of each of a plurality of slices of the enhanced image to generated curves representing the scalp in four directions.

* * * * *